United States Patent

Barde et al.

[11] Patent Number: 6,166,515
[45] Date of Patent: Dec. 26, 2000

[54] ELECTRICAL POWER SUPPLY CIRCUIT HAVING A SOLAR GENERATOR AND A BATTERY

[75] Inventors: Henri Barde, Toulouse, France; Simon Weinberg, Letchworth, United Kingdom

[73] Assignee: Astrium SAS, Paris, France

[21] Appl. No.: 09/421,109

[22] Filed: Oct. 19, 1999

[30] Foreign Application Priority Data

Oct. 21, 1998 [FR] France .................................. 98 13194

[51] Int. Cl.[7] .................................................. H01M 10/46
[52] U.S. Cl. ........................................ 320/101; 320/166
[58] Field of Search .................................... 320/101, 124, 320/128, 138, 166, 167; 136/292, 293; 323/906

[56] References Cited

U.S. PATENT DOCUMENTS

| | | |
|---|---|---|
| 4,494,063 | 1/1985 | Callen et al. ............................... 320/56 |
| 4,666,313 | 5/1987 | Gantgr et al. . |
| 5,025,202 | 6/1991 | Ishii et al. .................................. 320/32 |
| 5,488,283 | 1/1996 | Dougherty et al. . |
| 5,617,002 | 4/1997 | Sakamoto .................................... 320/2 |

FOREIGN PATENT DOCUMENTS

| | | |
|---|---|---|
| 853 124 | 7/1977 | Belgium . |
| 2 211679 | 7/1989 | United Kingdom . |

*Primary Examiner*—Edward H. Tso
*Attorney, Agent, or Firm*—Larson & Taylor, PLC

[57] ABSTRACT

The circuit has a power busbar, a solar generator made up of a plurality of sections that can be connected individually to the busbar via switches and a storage battery. The busbar is permanently connected to an energy-storage capacitor having a capacitance of at least 0.1 F. The busbar is powered from the battery via at least one discharge module controlled in on/off mode by a regulator which also controls the switches. The circuit is particularly suitable for use on low earth orbit (LEO) satellites.

11 Claims, 2 Drawing Sheets

ELECTRICAL POWER SUPPLY CIRCUIT HAVING A SOLAR GENERATOR AND A BATTERY

BACKGROUND OF THE INVENTION

The present invention relates to electrical power supply circuits using a solar generator as a source and including a battery. Such a circuit has a particularly important, but non-exclusive, application in the field of artificial satellites placed in low earth orbit (LEO). Such satellites pass periodically into the shadow of the earth, in general once on each revolution, thereby making their solar generators ineffective.

On-board electrical power supply circuits already exist on satellites that comprise a solar generator made up of a plurality of sections that are individually connectable to a power busbar by means of switches, together with a storage battery and a smoothing capacitor.

In that known circuit, the supply of electricity from the solar generator to the power busbar is controlled by a sequentially switched regulator operating with a limiting on/off cycle. A cycle of one of the sections being alternately put into and then out operation of service takes place for as long as the solar generator is capable of maintaining a reference voltage on the busbar. In contrast, the means enabling the battery to discharge to the power busbar comprise linear servo-controlled regulator means so as to maintain the voltage on the power busbar at a determined voltage while it is the battery that is powering the busbar. The circuit also has a filtering capacitor of small capacitance (capacitance of about one millifarad), serving to keep voltage variations on the power busbar down to a small value, where said variations are due to solar generator sections being switched, and serving as an energy storage device for the chopper regulator associated with the battery. Since the amount of energy stored by such a capacitor is very small, the cycle of connecting and disconnecting the busbar and the solar generator is short. Consequently, the switch means and the regulator must operate at high frequencies, thereby making it necessary to use high performance components, i.e. components which are therefore complex and expensive.

SUMMARY OF THE INVENTION

An object of the invention is to provide an electrical power supply circuit reducing the switching frequency, and that is considerably simpler than prior circuits.

For this purpose, the invention makes use of the fact that so-called "supercapacitors" are available that for given volume and weight present capacitance that is several orders of magnitude greater than the capacitance of a conventional capacitor, even an electrolytic capacitor. Such capacitors are themselves of the electrolytic type. Between their electrodes they have an electrolyte, and they are operated at a voltage that is too low for electrolysis to take place. Charge collects at the interfaces over a thickness of less than one nanometer, thus constituting the equivalent of a capacitor. Because of the small thickness of the dielectric, the capacitance can be extremely high. With certain capacitors of that kind that are now available, it is possible to achieve several thousand square meters of developed are per gram of active material, which explains the results that are obtained.

Consequently, the invention provides an electrical power supply circuit for powering loads, the circuit having a power busbar, a solar generator made up of a plurality of sections individually connectable to the busbar via switches, and a storage battery connected to the busbar via means enabling it to power the busbar. The busbar is permanently connected to an energy storage capacitor having a capacitance of not less than 0.1 F, and said means comprise at least one discharge module controlled in on/off mode by a regulator which also controls said switches.

In practice, for a satellite in low earth orbit, a capacitor will be used that has a capacitance of one or more farads in association with series resistance and inductance that are very low. This makes it possible to achieve opening and closing cycles for the switches and the discharge modules at a frequency lying in the range several tens of hertz to several millihertz.

In an advantageous embodiment, the circuit has a plurality of modules that are controlled in sequence and that constitute constant current generators. Particularly satisfactory results are obtained by constituting said modules in such a manner that they operate as circuits for raising the voltage of the battery under all operating conditions. This means that the electromotive force (emf) of the battery when fully charged remains lower than the lowest acceptable voltage on the power busbar.

The regulator is designed to put additional sections of the solar generator into operation in succession as and when they are required for maintaining the voltage on the power busbar at a reference value. For this purpose, the regulator can have means for delivering an error signal representative of the difference between the voltage present on the busbar and a reference voltage, and comparators for successively bringing into operation an increasing number of sections, followed by modules, depending on the error signal.

The battery can be powered either from the power busbar, or from an auxiliary solar generator via a regulator that is responsive to the voltage across the terminals of the battery and to the current flowing therethrough, so as to avoid delivering excessive current.

The above characteristics and others will appear more clearly on reading the following description of a particular embodiment of the invention, given by way of non-limiting example. The description refers to the accompanying drawings.

DETAILED DESCRIPTION OF THE DRAWINGS

Figure 1:
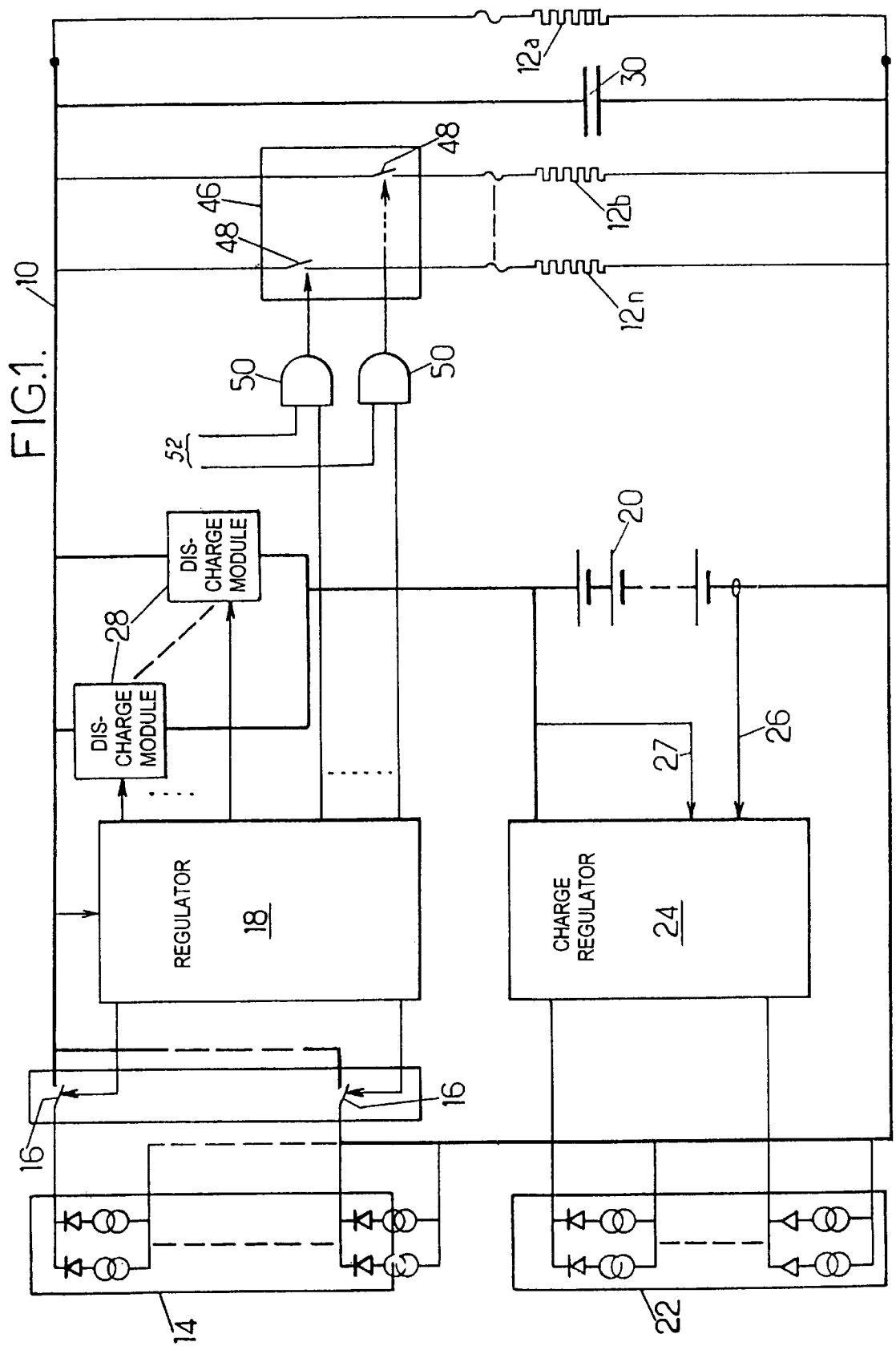
FIG. 1 is a block diagram of the circuit.

In FIG. 1, the power busbar 10 of the circuit is drawn in heavy lines. This busbar powers permanent loads such as 12a belonging to the satellite and disconnectable loads 12b, . . . , 12n.

The power source of the circuit is constituted by a solar generator 14 subdivided into a plurality of sections each provided with a member enabling the supply of power from a section of the solar generator 14 to be established or interrupted by opening a circuit, by short circuiting, or by shunting. In FIG. 1, these members are represented by switches 16 for establishing and interrupting the connection between the sections of the solar generator and the power busbar. In practice, the switches are generally constituted by MOS type field effect transistors known as MOSFETs.

A regulator 18 controls the supply of power from the solar generator. It controls the switches 16 by implementing a sequential switching process that serves solely to put some variable number of sections of the solar generator 14 into and out of service in such a manner as to maintain the voltage V on the power supply busbar at a reference value Vc.

The circuit has one or more electrochemical batteries 20 for continuing to feed power to the busbar during eclipses and to participate in absorbing power consumption peaks that exceed the supply capacity of the solar generator. In the example shown in FIG. 1, the battery is kept charged by an auxiliary solar generator 22. The solar generator 22 is connected to the battery via a charging regulator 24 that may be of conventional type. On inputs 27 and 26, it receives signals representative of the voltage across the terminals of the battery and representative of the current passing through the battery, so as to avoid excessive currents or voltages.

In a modified embodiment, the auxiliary solar generator is omitted and the battery is recharged from the power busbar.

The feed to the power busbar by drawing current from the battery 20 is under the control of one or more discharge modules 28.

Finally, a capacitor 30 is placed between the positive and negative terminals of the power busbar 10 to absorb the transients that are caused by feed to the busbar from the solar generator being established or being interrupted.

The above-described general structure is conventional. However the capacitor used in conventional systems has, for reasons of weight and volume, a capacitance which does not exceed a few mF. Consequently, it stores a small amount of energy only so that stabilizing the voltage of the power busbar, when it is itself fed by on/off switches, requires the switch members to be operated at a frequency that is very high.

In practice, this makes it necessary to provide battery discharge modules 28 having linear servo-control, i.e. modules that are operated in a manner that is entirely different from the sequential switching of the sections of the solar generator. Furthermore, the small contribution from the capacitor makes it necessary to draw high current from the battery during consumption peaks.

These drawbacks are eliminated or at least greatly attenuated by the circuit of the invention.

Firstly, the capacitor or the bank of capacitors of conventional type as used in the past, having a capacitance of mF order, is replaced by capacitor means whose capacitance is at least two orders of magnitude greater. On a satellite, a capacitance lying in the range 0.1 F to 1 kF will normally be used. Greater capacitances can be adopted when restrictions concerning weight and volume are less important than they are on a satellite.

In addition, the connection between the battery and the power busbar takes place through at least one discharge module operating in on/off mode with a limit cycle, operating in a mode similar to the mode of operation of the switches 16. By means of this disposition, the device is made to be intrinsically stable and the method of regulation is made homogeneous.

Advantageously, a plurality of discharge modules 28 constituting current generators are used, thereby simultaneously providing at least partial redundancy and making stepped operation possible. These modules can all have the same nominal power, typically lying in the range 500 W to 1 kW on a satellite. They can also be of different individual powers. Because of the smoothing effect provided by the capacitor 30, the rate at which the modules are switched on and off can be much lower than in a prior art circuit.

Each of the discharge modules 28 can constitute a voltage-raising circuit, and the battery is such that its emf, and thus the maximum potential difference across its terminals, is always less than the voltage actually present on the power supply busbar, even when said voltage has dropped after current has been drawn in excess of the capabilities of the solar generator and the battery.

Figure 2:
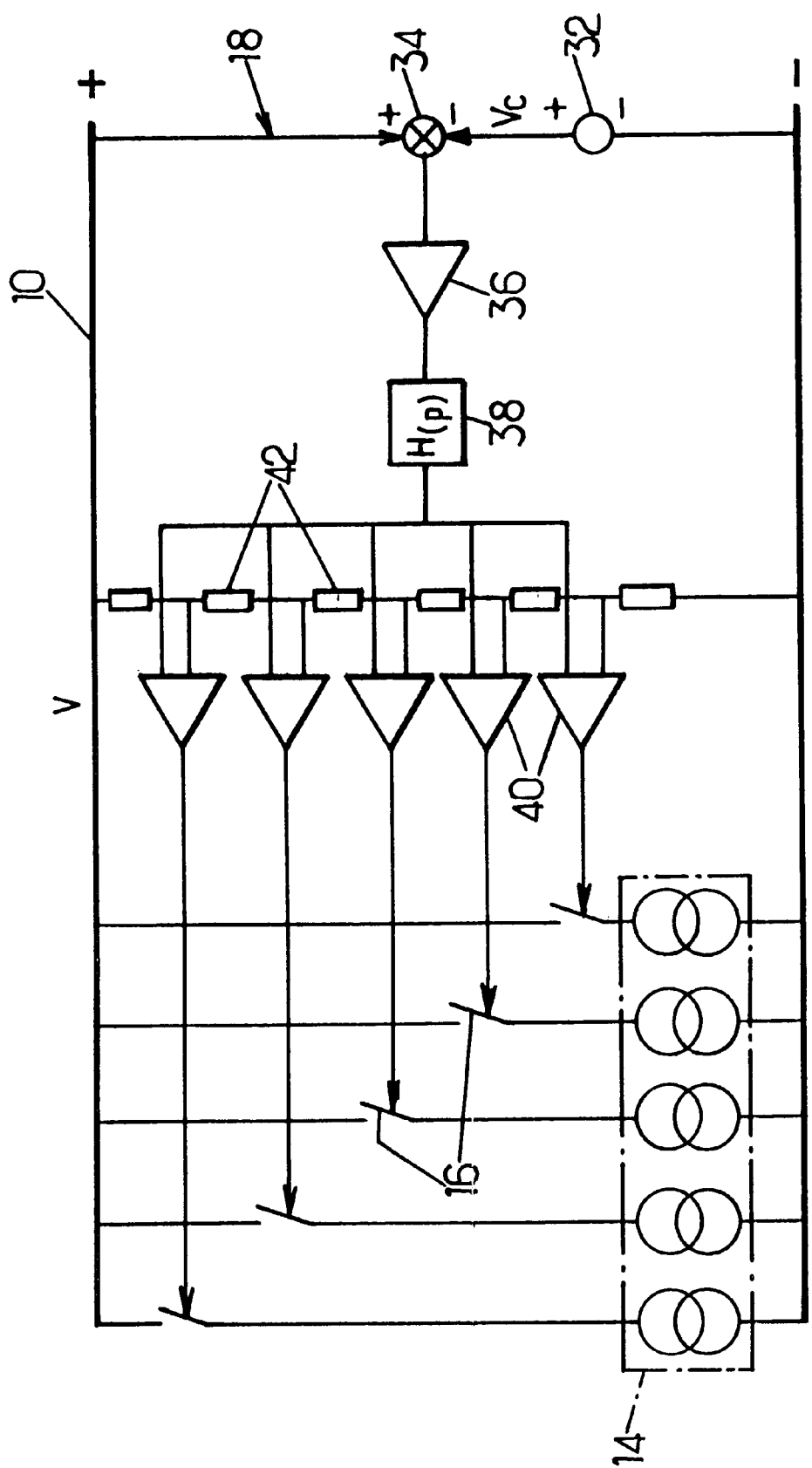
FIG. 2 is a block diagram showing one possible structure of the regulator of the FIG. 1 circuit.

For the purpose of controlling the switches 16, the main regulator can have the structure shown in FIG. 2.

The regulator 18 is designed to maintain a reference voltage Vc on the power busbar 10 except when the power drawn from the circuit exceeds the combined supply capacity of the solar generator plus the storage battery. It comprises a reference voltage generator 32 and a comparator 34 whose output supplies an error voltage equal to the difference between the voltage V actually present on the busbar and the reference voltage Vc. The error signal is raised to an appropriate level by an amplifier 36 which provides a signal proportional to the difference between V and Vc. A correcting filter 38, e.g. of the PID type, can be provided on the output of the amplifier 36 so as to reduce statistical error to a value that is practically zero. Finally, the error voltage as amplified and corrected is applied to a battery of comparators 40 each of which controls one of the switches 16. Each of these comparators has one input receiving the error voltage and other input receiving a respective voltage that is different for each comparator and that is supplied by a voltage ladder constituted by a series of resistors 42 connected in cascade. The voltage comparators are activated and deactivated sequentially when the voltage V varies. The solar generator sections 14 can have unit powers that are mutually equal or that are not equal.

The method in which the discharge modules 28 are controlled can be similar to the above except insofar as the switches 16 are replaced by voltage-raising modules 28 constituting generators of a current that is constant in spite of variations in the voltage V, particularly when the solar generators are inoperative.

The operation of the circuit as described above is as follows.

Busbar being fed by the solar generator

Because the switches 16 operate in on/off mode, the total current being supplied by the sections that are in operation is generally not identical to the current being drawn at the same instant by the loads 12*a*, . . . , 12*n*. If the total current supplied is less than the current drawn, the extra current is drawn from the capacitor 30, which discharges. Simultaneously, the voltage V will tend to drop below the reference voltage Vc. The resulting error signal causes an additional generator section 14 to be brought into service by the regulator 18. The total current delivered by the solar generator thus increases and as a general rule then exceeds the current being drawn. As a result the capacitor 30 charges and the voltage Vc becomes greater than Vc until it causes the section which has just been brought into service to be taken back out of service. The preceding cycle then starts over.

This mode of operation is similar to that of the prior art circuit described in document BE-A-853 124 or U.S. Pat. No. 4,186,336, except that the rates at which the switches are opened and closed are much slower, because the amount of energy stored by the capacitor or by the bank of capacitors 30 is much greater. In practice, in a circuit and under conditions that are representative of the situation on board a satellite, a capacitor having a capacitance of less than 1 F suffices to bring the switching frequency down to a value of less than 10 Hz, thereby making it possible to optimize operation of the current solid state switches.

Power taken from the battery and possibly also from the solar generator

As mentioned above, prior art circuits require regulation with linear servo-control for the discharge module(s) of the battery connecting it to the power busbar.

In the context of the invention, the battery is connected to the power busbar via a plurality of discharge modules 28 operating in on/off mode.

Each discharge module 28 constitutes a constant current source which is put into and out of operation in the same manner as a section of the solar generator, under the control of the regulator 18. However these modules are put into service only when all of the sections of the solar generator are already in service and are incapable of delivering the current being drawn. The modules can consequently be put into service by comparators connected in cascade with those used for controlling the sections of the main solar generator.
Power supplied by the capacitor If the demand from the loads exceeds that which can be supplied by the solar generator and the batteries together, then regulation can no longer be maintained: the capacitor 30 supplies current and simultaneously the voltage on the busbar decreases for as long as the available power remain insufficient.

When the load decreases, the excess current supplied by the solar generator 14 and by the battery 20 via the modules 28 serves firstly to recharge the capacitor 30, and then to reestablish regulation and to recharge the battery.
Possible operation with load-shedding The circuit shown diagrammatically in FIG. 1 is designed to power loads, some of which, referenced 12b to 12n, are not essential. ON a satellite, they can be concerned, for example, with temperature control of the platform or with some of the active components. These loads are then powered by means of a load-disconnect circuit 46 which includes switches controlled by the regulator 18. Control can take place by means of AND gates 50 enabling inessential loads to be shed, in application of a sequence that is stored in the regulator 18. The inputs 52 constitute normal commands for the loads coming from a central control unit.

In this way, load-shedding constitutes a logical continuation of the power supply sequence implemented by the solar generator and then by the battery, in the event of the voltage dropping even further.

The invention can be implemented in numerous other ways. The way in which the battery is recharged can be different from that described. A plurality of solar generators can be provided. The solar generator sections can be of mutually different powers and they can be controlled so that it is always the lowest power section that is subjected to cycling, thus requiring switching of the links to the comparators.

What is claimed is:

1. An electrical power supply circuit for powering loads from a bus bar, the circuit having:
   a power busbar,
   a solar generator made up of a plurality of sections individually connectable to the busbar via respective switches,
   a storage battery connectable to the busbar via means enabling said battery to deliver power to the busbar, said means comprising at least one discharge module controlled in on/off mode by a regulator which also controls said switches, and
   an easy storage capacitor having a capacitance of at least 0.1 F and permanently connected to the busbar.

2. A circuit according to claim 1, characterized in that the capacitor has a capacitance lying in the range one to several farads.

3. A circuit according to claim 1, characterized in that it comprises a plurality of modules (28) controlled sequentially and constituting constant current generators.

4. A circuit according to claim 3, characterized in that said modules operate as battery voltage-raising modules.

5. A circuit according to claim 4, characterized in that the electromotive force of the battery, when fully charged, is less than the lowest acceptable voltage on the power busbar.

6. A circuit according to claim 1, characterized in that the regulator is designed to bring additional sections of the solar generator (14) and then modules successively into service as they become necessary for maintaining the voltage on the power busbar at a reference value.

7. A circuit according to claim 6, characterized in that the regulator has means for supplying an error signal representative of the difference between the voltage on the busbar and the reference voltage, and comparators (40) for successively bringing into service an increasing number of sections and then of modules (28) depending on the error signal.

8. A circuit according to claim 1 characterized in that the battery is powered from an auxiliary solar generator via a regulator that is responsive to the voltage across the terminals of the battery and to the current passing therethrough.

9. A circuit according to claim 1 characterized in that the regulator is designed to eliminate certain loads sequentially in response to the voltage on the power busbar dropping after all of the sections and the battery have been put into service.

10. An electrical power supply circuit according to claim 1, comprising a plurality of modules arranged to be put sequentially in operation in response to increase of power demand by said loads and each constituting a constant current generator.

11. An electrical power supply circuit for powering loads from a bus bar, the circuit having:
   a power busbar,
   a solar generator made up of a plurality of sections individually connectable to the busbar via respective switches,
   a storage battery connectable to the busbar for delivering power to said busbar by a plurality of discharge modules each controlled in on/off mode to be put in operation sequentially by regulator means after said regulator means have controlled said switches to put into operation all said sections of said solar generator and current supply by said solar generator is insufficient to fulfill electrical current demand from said load, and
   an energy storage capacitor having a capacitance of at least 0.1 F and having a continuous electrical connection with a busbar.

* * * * *